June 30, 1942.  G. E. ROWE  2,288,029
APPARATUS FOR FORMING HOLLOW GLASS ARTICLES
Filed Nov. 4, 1937
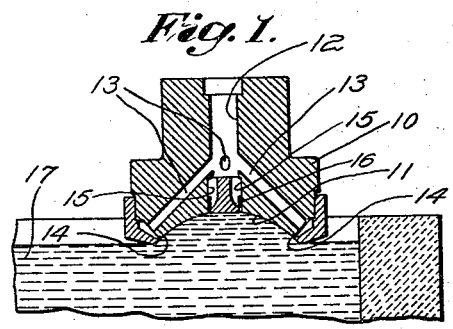
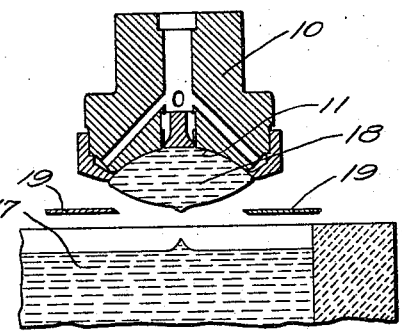
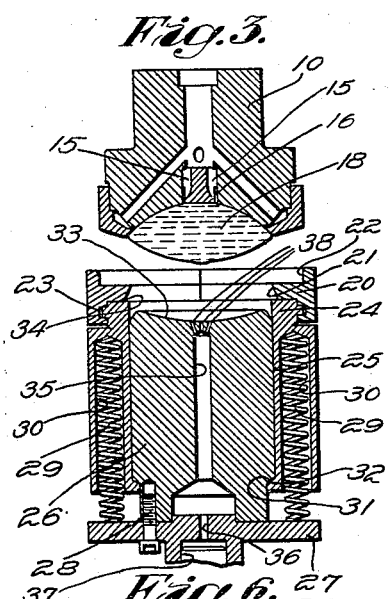
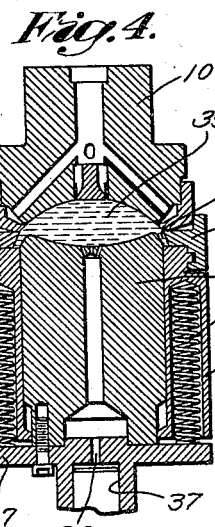
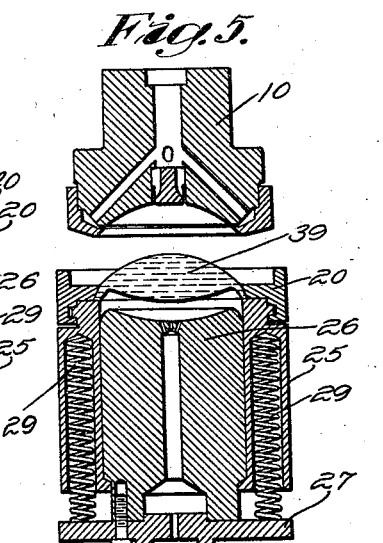
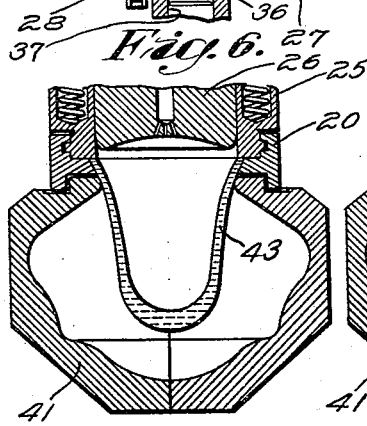
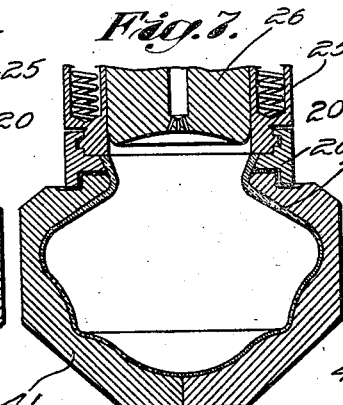
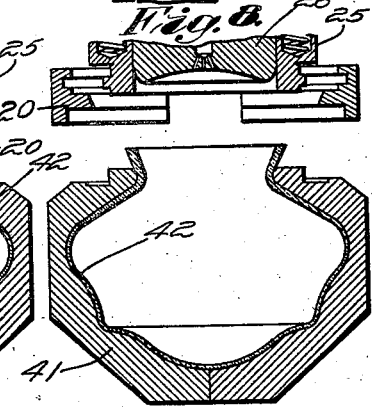
Witness
W. B. Thayer
Inventor
George E. Rowe
by Brown + Parham
Attorneys Patented June 30, 1942

2,288,029

UNITED STATES PATENT OFFICE 2,288,029

APPARATUS FOR FORMING HOLLOW GLASS ARTICLES

George E. Rowe, Wethersfield, Conn., assignor to Hartford-Empire Company, Hartford, Conn., a corporation of Delaware Application November 4, 1937, Serial No. 172,682

2 Claims. (Cl. 49—5)

This invention relates to the manufacture of hollow glass articles, and more particularly to the manufacture of relatively large thin walled articles, such as electric light shades, jars and other generally similar articles.

An object of the invention is to provide a simple but reliable and efficient apparatus by which suitable charges may be obtained from a supply body of molten glass and rapidly formed into articles of the above general description in such a way and by such means that each article will be formed with walls of substantially uniform thickness and with a finished neck or rim portion.

A further object of the invention is to provide an apparatus of the press and blow type for forming charges of molten glass into articles of the above description without producing any moils or unfinished portions to be "cracked off" or detached from the finally blown articles.

A still further object of the invention is to provide an apparatus of the press and blow type by which articles of the above description may be formed of successively obtained charges, so that the walls of each of such articles will be of substantially uniform thickness throughout all parts of that article, and will comprise all the glass of the charge even though there may be slight differences in the weights of different charges.

Manufacture by machinery of charges of molten glass into hollow articles having walls of substantially uniform thickness throughout is difficult of accomplishment, even under the most favorable conditions and is especially difficult when the article to be made is to have relatively thin walls, i. e., is to be relatively large as compared with the charge, and is to be formed with a finished neck or rim portion. The many peculiarities of molten glass, including its low heat conductivity, its tendency to form an external skin or enamel which will be different in thickness, elasticity and character at different places according to differences in external and internal thermal influences at those places, and the inability of any crumpled or infolded portion of such skin or enamel ever to coalesce or merge satisfactorily with a hotter internal portion of the charge, all contribute to the difficulty of satisfactorily accomplishing such manufacture. Many articles of the character described, such as electric light shades, still are made generally by old, slow and costly hand methods which permit an extensive range of manipulations of the glass blank during its development and blowing, reheating operations, etc., and such articles usually also are formed with moils or unfinished portions of substantial size which must be "cracked off" or separated from the article being made.

The present invention permits machine production of articles of the character described because it makes provisions for utilizing to best advantage certain of the peculiarities of molten glass and for obviating the adverse effects of other such peculiarities. The manner in which this is done and the results accomplished will hereinafter become apparent from or be particularly pointed out in the following description of a typical series of steps of my novel method, as illustrated in the accompanying drawing, which also shows novel structural features of the present invention.

In the drawing, which comprises a series of fragmentary vertical sectional views:

Figure 1 shows a blank mold having a wide-mouthed shallow cavity suitable for use in the performance of a step of the method of the invention and disposed in a glass gathering position at the surface of a supply pool of molten glass, Fig. 2 shows the glass gathering blank mold after it has been raised from the supply pool and a charge of gathered glass in the cavity thereof has been severed by cooperative shear blades from the glass of the supply pool, Fig. 3 shows the blank mold and the charge therein above a cooperative neck mold and combined pressing plunger and blow head assembly, Fig. 4 shows the blank mold and the neck mold and combined pressing plunger and blow head assembly after they have been brought together and the plunger operated to press the charge in the then combined blank mold and neck mold cavities, Fig. 5 shows the blank mold and the cooperative parts above mentioned after they have been separated at the completion of the operation of pressing the charge to form a shaped blank having a supporting rim or neck finish portion retained in the cavity of the neck mold, Fig. 6 shows the neck mold and combined pressing plunger and blow head assembly after such assembly and the shaped glass blank supported thereby have been reverted or swung through 180° from the position shown in Fig. 5, and have been brought into cooperative relation with a final blow mold into which the partially developed body of the glass blank depends, Fig. 7 shows the cooperative parts in the same relation as in Fig. 6 but after the body of the glass blank has been expanded by blowing pressure against the walls of the blow mold cavity, and Fig. 8 shows the neck mold open and the neck mold, plunger and blow head assembly separated from the blow mold and from the finally blown article which, at this stage of the proceedings, is supported by the blow mold.

The blank mold, designated 10, has a comparatively shallow cavity 11. The mouth or intake portion of this cavity is relatively wide and is located at the bottom of the blank mold. As shown, the cavity 11 is concavely curved throughout, so as generally to have a shape similar to that of the surface of a portion of a sphere substantially less than a hemisphere. The blank mold 10 is provided with a suction passage 12 which communicates with the cavity 11 near its rim edge, as through outer branch suction passages 13 and an annular slit 14, and also with the upper portion of the cavity, as through inner branch suction passages 15 and a smaller annular slit 16.

It is immaterial how the blank mold is formed so long as it is provided at its bottom with a cavity of suitable shape and size and with suction connections communicating with this cavity at appropriate places to produce the results desired. It is desired that the cavity shall be completely filled with glass from a pool 17 when the blank mold is in its glass gathering position, as shown in Fig. 1. It also is desired that a glass charge, such, for example, as that indicated at 18 in Fig. 2, shall be retained firmly in contact with the wall of the cavity 11 throughout the area of the latter when the blank mold has been raised from its gathering position and the glass charge therein has been severed from the glass of the supply pool. The wide mouth of the cavity facilitates rapid filling of the cavity when the blank mold is at its gathering position, even though the glass should be of lower temperature and more viscous than heretofore have been usual in pools from which glass is to be gathered in suction receptacles. It may be desired for the manufacture of certain articles and in some manufacturing activities to gather glass of such relatively low temperature and high viscosity although, of course, hotter and less viscous glass may be gathered with equal facility.

The gathered charge may be separated from the glass of the supply pool by any suitable means, as by shears which are represented by the shear blades 19, Fig. 2.

The charge 18 may have convexly curved top and bottom portions, or in other words, have substantially similar portions above and below the plane of the rim edge of the gathering mold cavity. To obtain such a charge the severance of the charge will be effected at a plane spaced below the gathering mold and quickly after such mold has been raised a short distance from the supply pool. The contact of the shear blades thus will be confined to a small section of glass at the center of the bottom or lower end of the charge. Any glass chilled or "scarred" by the shears thus will be located in the most desirable position, in that reheating thereof by heat from the body of the glass charge will be facilitated. Also, should any chilled or "scarred" glass persist through the subsequent article forming operations, such glass will not be located at the exterior of the article where it would impair the appearance thereof.

In addition to the glass gathering blank mold, the invention provides a novel assembly of parts for cooperating with such blank mold.

This assembly comprises a neck ring 20 having an intermediate glass receiving portion 21 and larger or counterbored outer and inner end portions 22 and 23, respectively. The portion 21 of the neck ring may increase in diameter from its outer to its inner end, as shown, better to retain and grip the glass in contact therewith, as will presently appear. The neck ring may be formed of cooperative sections, as is usual.

The inner end portion 23 of the neck ring is grooved internally to fit on and grip an externally ribbed or flanged end portion 24 of a cylindrical member 25 when the sections of the neck ring are closed. The member 25 serves as a carrier for the neck ring and as a casing for a plunger 26 which is mounted for limited reciprocatory movement in this casing. The plunger 26 is secured to a head 27, as by a screw 28, so that compression springs 29 are retained in place between portions of the head and the bottoms of longitudinal pockets 30 in the walls of the cylinder 25. These springs are mainly disposed in these pockets and tend to urge the cylinder 25 and the neck ring away from the head to the position shown in Fig. 3. An internal shoulder 31 on the cylinder 25 then abuts an external shoulder 32 on the plunger 26 and prevents further movement of the cylinder on the plunger under the pressure of the springs. At this time, the plunger will be retracted in the cylinder so that its outer or glass contacting end 33, which may be concavely curved, as shown, will be located inwardly from the glass receiving portion of the neck ring. It also will be noted that the inner diameter of the cylinder may be less than the diameter of the adjacent end of the glass receiving portion of the neck ring. An annular shoulder or end wall 34 thus is provided at the inner end of the glass receiving portion 21 of the neck ring.

The plunger 26 has a central passage 35 which communicates through an opening 36 in head 27 with a pressure air supply conduit or connection 37. Narrow slits 38 at the tip of the plunger communicate with the passage 35 and permit application of air under pressure through the plunger to the interior of the neck ring.

The outer end portion 22 of the neck ring is adapted to fit over and embrace the adjacent end or rim portion of the blank mold when the head 27 and the parts supported thereon are moved vertically from the position shown in Fig. 3 to the position shown in Fig. 4. The arrangement is such that the neck ring will be guided into position to cause the glass receiving portion 21 thereof to form an extension of the wall of the cavity 11 of the blank mold. The plunger 26 will be projected upwardly by the continued upward movement of the head 27 until it reaches the position shown in Fig. 4. These operations and relative movements of the parts mentioned will cause glass of the lower portion of the gathered charge to be forced into the cavity of the neck ring between the raised tip of the plunger and the glass receiving portion 21 of the neck ring while all the glass of the charge will be pressed into a compact blank of the shape desired in the cooperative combined cavities of the blank mold and neck mold. The resultant blank will have a shaped body portion 39 and a rim flange or neck portion 40.

It is to be noted that the body portion 39 of the blank, which comprises all the glass which subsequently will be formed into the walls of the body of the article being made, has had its outer surface continuously in contact with the wall of the blank mold cavity at all points on that surface from the time the glass of the charge was gathered, as illustrated in Fig. 1, until a shaped blank having a rim flange or neck portion has been completely formed, as illustrated in Fig. 4. Consequently, all this surface has been subjected to the same chilling contact for the same length of time and the skin or enamel that forms thereon will be of uniform thickness, elasticity, aand characteristics throughout. This is important since this is the skin which will form the external portion of the body of the final article and of course must be stretched and expanded to have the size and shape desired for that article.

It also is to be noted that the glass that has been forced into the neck mold to form the rim flange or neck portion of the blank is obtained from a pendant portion of the charge that has been laterally unsupported and out of contact with any chilling medium other than air from the time the charge was gathered until the shaped blank is formed in the manner that has been described. The glass that is to form the rim flange or neck portion thus is of substantially uniform consistency and condition, and is sufficiently plastic to move readily under the pressure applied into all available space in the narrow restricted rim flange or neck forming cavity of the neck mold.

After the stage of operations illustrated in Fig. 4 has been reached, the blank mold and the neck mold may be separated, leaving the blank supported by its rim flange or neck portion in the neck mold. This may be accomplished by moving the head 21 and the parts carried thereby downwardly from the blank mold. As a result of this movement, the springs 29 will be effective to retract the plunger 26 from contact with the blank, as shown in Fig. 5.

The subsequent development of the blank and its final blowing to form the article desired may be accomplished by any suitable known sequence of steps and specific operations, such, for example, as those customarily employed in forming such an article by a paste-mold process. Such a process may involve partial blowing of the blank in air either while the blank carrying mechanism is in inverted position, as shown in Fig. 5, and/or after the blank carrying mechanism is being reverted or turned through 180° to suspend the blank therefrom and/or after such reversion prior to disposing the blank in a final blow mold. Also, spinning of the blank may be effected, as by turning the blank carrying mechanism about its longitudinal axis, which extends through the center of the blank. This may be done prior to and/or after the blank has been lowered into a final blow mold, as is well known in the art of manufacturing hollow glass articles by paste-mold processes.

As shown in Fig. 6, the blank carrying mechanism has been reverted and the body of the blank, designated 43, which has been developed or has sagged somewhat has been disposed within a final blow mold 41, with which the blank carrying mechanism is in cooperative relationship. Air under pressure may be applied through the plunger 26 and neck mold to blow the body of the blank against the walls of the cavity of the mold 41, thereby producing the finally blown article, which may be an electric light shade, as shown in Fig. 7. The neck ring then may be opened to release the rim flange or neck portion of the article 42 and the neck ring and its associate structure and the blow mold may be separated or moved apart. Subsequently, the glass article may be removed from the blow mold in any suitable known way, or by any suitable known means, and to permit this operation, the sections of the blow mold may be opened, as is customary.

The operations may be repeated to produce other similar articles. Any suitable known structures may be employed to support and operate the parts which have been particularly described herein, so that these parts will perform the functions and accomplish the results which herein have been pointed out.

It is believed to be unnecessary to illustrate in the drawing or to describe herein any particular supporting and operating structure, as the same may be readily provided by those skilled in the art who may desire to practice the invention.

It will be noted that the article produced according to the invention has relatively thin walls of approximately uniform thickness throughout or at least throughout the body thereof and may have a smoothly finished rim flange or neck portion. Of course, the thickness of the latter may be controlled by the width of the glass receiving cavity of the neck mold at the time of formation of such rim flange or neck portion.

I claim:

1. In apparatus for forming hollow glass articles, a glass gathering blank mold having a wide-mouthed shallow cavity of substantially less depth than the width of the glass intake mouth thereof, a neck ring having a cavity of appropriate size and contour to form, in effect, an extension of the blank mold cavity when the neck ring is disposed in cooperative registering relation with the blank mold, a cylindrical carrier for the neck ring aligned therewith and having an inner diameter less than that of the neck ring, a pressing plunger mounted to slide in said cylindrical carrier between a position at which the plunger is withdrawn from the neck ring and a position at which the plunger projects into said neck ring in spaced relation with the wall of the neck ring cavity, means limiting the relative movements of the plunger and the cylindrical carrier, a head carrying said plunger, and spring means between said cylindrical carrier and said head tending to maintain the plunger retracted with respect to said neck ring.

2. In apparatus for forming hollow glass articles, a glass gathering blank mold having a wide-mouthed shallow cavity of substantially less depth than the width of the glass intake mouth thereof, a neck ring having a cavity of appropriate size and contour to form, in effect, an extension of the blank mold cavity when the neck ring is disposed in cooperative registering relation with the blank mold, a cylindrical carrier for the neck ring aligned therewith and having an inner diameter less than that of the neck ring, a pressing plunger mounted to slide in said cylindrical carrier between a position at which the plunger is withdrawn from the neck ring and a position at which the plunger projects into said neck ring in spaced relation with the wall of the neck ring cavity, means limiting the relative movements of the plunger and the cylindrical carrier, a head carrying said plunger, and spring means between said cylindrical carrier and said head tending to maintain the plunger retracted with respect to said neck ring, said head and said plunger being formed with passages adapted to conduct air under pressure to the interior of said neck ring.

GEORGE E. ROWE.